United States Patent [19]
Woodside et al.

[11] Patent Number: 5,626,643
[45] Date of Patent: May 6, 1997

[54] CONTACT DRYING OF FIBERS TO FORM COMPOSITE STRANDS

[75] Inventors: Andrew B. Woodside, Pickerington; James V. Gauchel, Newark; Larry J. Huey, Granville; David L. Shipp, Newark; Frank Macdonald, Granville; Peggy M. Woodside, Pickerington; Douglas B. Mann, Westerville, all of Ohio

[73] Assignee: Owens-Corning Fiberglas Technology Inc., Summit, Ill.

[21] Appl. No.: 311,817

[22] Filed: Sep. 26, 1994

[51] Int. Cl.⁶ ................................................ C03B 37/022
[52] U.S. Cl. .............................. 65/442; 65/900; 65/443; 65/453; 264/211.14; 264/172.14; 264/172.18
[58] Field of Search .............................. 65/442, 453, 443, 65/900; 264/211.12, 211.14, 172.14, 172.18; 118/59, 420

[56] References Cited

U.S. PATENT DOCUMENTS

| | | | |
|---|---|---|---|
| 2,224,274 | 12/1940 | Powers | 65/453 |
| 2,673,385 | 3/1954 | Williamson | 118/59 |
| 2,673,546 | 3/1954 | Newton | 118/59 |
| 3,042,570 | 7/1962 | Bradt . | |
| 3,116,192 | 12/1963 | Eilerman | 65/453 |
| 3,134,704 | 5/1964 | Modigliani | 65/453 |
| 3,155,122 | 11/1964 | Grant . | |
| 3,349,222 | 10/1967 | Johnston . | |
| 3,620,701 | 11/1971 | Janetos et al. . | |
| 3,718,448 | 2/1973 | Drummond | 65/453 |
| 3,887,347 | 6/1975 | Reese . | |
| 3,918,947 | 11/1975 | Maaghul et al. . | |
| 3,936,996 | 2/1976 | Schiffer . | |
| 4,042,360 | 8/1977 | Kane et al. . | |
| 4,236,323 | 12/1980 | Dammann et al. . | |
| 4,530,876 | 7/1985 | Brodman . | |

(List continued on next page.)

FOREIGN PATENT DOCUMENTS

| | | |
|---|---|---|
| 0351201 | 1/1990 | European Pat. Off. . |
| 0367661 | 5/1990 | European Pat. Off. . |
| 0505275 | 9/1992 | European Pat. Off. . |
| 0505274 | 9/1992 | European Pat. Off. . |
| 0616055 | 9/1994 | European Pat. Off. . |
| 216493 | 3/1983 | Germany . |
| WO9412707 | 6/1994 | WIPO . |

OTHER PUBLICATIONS

McConnell, "Metal Replacements", Plastics Design Forum, Nov./Dec. 1989, pp. 35–37, 41–42, 46, 48.

Wenger et al., "Advancements in Glass Reinforced Thermoplastics—The long and Short Story, Akzo Engineering Plastics, Inc." Evansville, Indiana no date.

Reinforced Plastics Newsletter, Market Search, Inc., vol. XVIII, No. 38, Sep. 1994.

Sajna, J., SAE Technical Paper Series #930168, "Effects of Reinforcing Fiber Length on the Properties of Injection Molded Polypropylene, International Congress and Exposition Detroit", Michigan, Mar. 1–5, 1993.

"The Long and Short of Fiber—Reinforced Thermoplastic Advanced Materials", ICI no date.

*Primary Examiner*—John Hoffmann
*Attorney, Agent, or Firm*—C. Michael Gegenheimer; Inger H. Eckert; Linda S. Evans

[57] ABSTRACT

A method and apparatus are provided for producing composite strands. The apparatus comprises a heated bushing for supplying streams of molten glass to be drawn into continuous first fibers; a drawing device adapted to draw the streams into the first fibers; supply equipment for supplying one or more second fibers of a second material; one or more applicators for applying a size to the first and second fibers; and a device for gathering the first and second fibers into one or more composite strands. The composite stands are made by drawing glass fibers from the bushing; applying sizing to the glass fibers and the second fibers; contacting the fibers with a heated contact plate to dry the fibers; and then commingling the fibers to form one or more composite strands.

17 Claims, 5 Drawing Sheets

U.S. PATENT DOCUMENTS

| | | |
|---|---|---|
| 4,567,102 | 1/1986 | Pollet et al. . |
| 5,011,523 | 4/1991 | Roncato et al. . |
| 5,026,410 | 6/1991 | Pollet et al. . |
| 5,042,111 | 8/1991 | Iyer et al. . |
| 5,042,122 | 8/1991 | Iyer et al. . |
| 5,055,119 | 10/1991 | Flautt et al. . |
| 5,102,690 | 4/1992 | Iyer et al. . |
| 5,123,373 | 6/1992 | Iyer et al. . |
| 5,128,199 | 7/1992 | Iyer et al. . |
| 5,134,959 | 8/1992 | Woodmansee et al. . |
| 5,176,775 | 1/1993 | Montsinger . |
| 5,236,743 | 8/1993 | Bates et al. . |
| 5,298,576 | 3/1994 | Sumida . |
| 5,316,561 | 5/1994 | Roncato et al. . |
| 5,328,493 | 7/1994 | Roncato et al. . |
| 5,425,796 | 6/1995 | Loubinoux ................ 65/442 |
| 5,443,611 | 8/1995 | Salvador et al. . |
| 5,454,846 | 10/1995 | Roncato .................. 65/442 |
| 5,470,658 | 11/1995 | Gaseq ..................... 65/443 |

FIG. 1
FIG. 1A
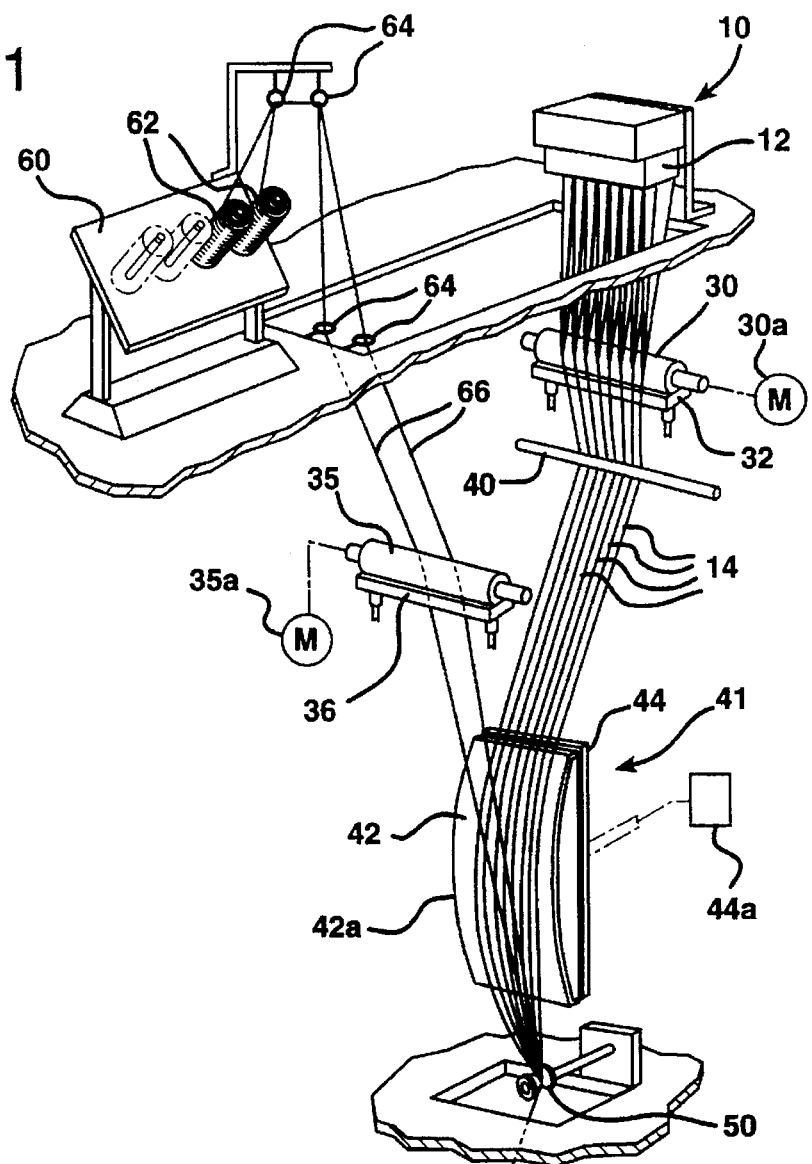
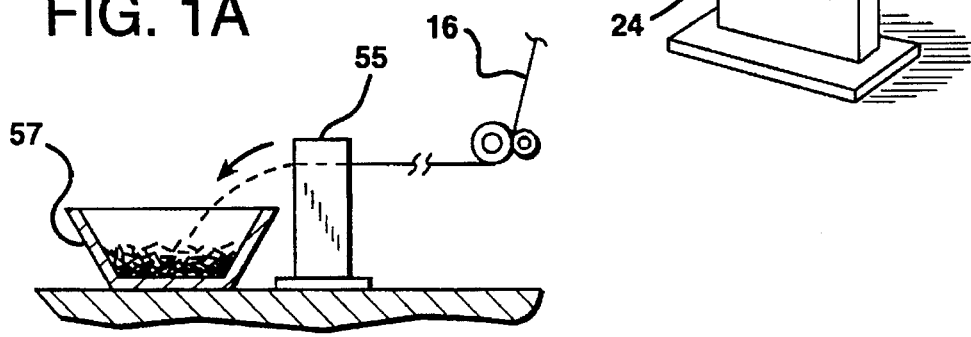

CONTACT DRYING OF FIBERS TO FORM COMPOSITE STRANDS

BACKGROUND OF THE INVENTION

The present invention relates generally to composite material manufacture and, more particularly, to a method and apparatus for forming composite strands from glass fibers and other materials such as organic fibers.

A variety of methods exist for producing composite strands containing glass and organic material. Methods such as solution processing, slurry processing, and melt impregnation involve passing a finished glass fiber tow through a polymer-containing liquid. The polymer clings to the tow and results in a composite material. Another method, known as film stacking, requires stacking fiber tows between sheets of thermoplastic material and applying pressure for a prolonged period of time. Yet another method, called dry powder impregnation, involves applying a thermoplastic powder to a fiber tow and then heating to sinter the powder particles to the fibers.

All of the above-mentioned methods have various disadvantages. A common disadvantage of all the methods is the fact that one or more off-line (glass tow spreading) processing steps are required to produce a final composite strand product. Such off-line steps increase the cost of the product and complexity of production.

Another method for producing composite strands, fiber commingling, can be performed using an in-line process. Processes such as the one disclosed in U.S. Pat. No. 5,011,523 supply molten glass to a bushing, draw glass fibers from the bushing, and apply a size to the fibers via an applicator roller. The sized fibers are gathered into one or several yarns which are then combined with polymer fibers. The resulting mass of fibers is collected into a single tow at an assembly device and then either wound on a collet to produce a composite strand package or immediately cut into sections.

Despite being an in-line process, methods such as the one described above have several disadvantages. Of particular interest is the problem of the location of polymer within the finished strand. Specifically, the strand of composite material produced does not have thermoplastic material distributed throughout the product cross section. Rather, the polymer merely encompasses the glass fibers. Also, the amount of binder/size in the final product is very small (about 0.5%). Therefore, a composite material formed from these products will not have polymer distributed throughout its cross section and the fibers will not be strongly bound together.

Accordingly, there is a need for an improved composite strand forming process which results in dispersing thermoplastic fibers with glass fibers throughout the composite strand cross section and a relatively high binder/size percentage in the composite strand product. There is further a need for an improved process for forming a composite strand product which allows it to be produced in a more efficient and economical manner.

SUMMARY OF THE INVENTION

These needs are met by the present invention, whereby one or more composite strands are formed in an improved in-line process. This method has the advantage of providing composite strands comprising first and second discrete fibers, with the second fibers being interspersed with the first fibers throughout the strand cross section. Further, the strands have a relatively high binder/size percentage which results in the first and second fibers being strongly bound together.

In accordance with a first aspect of the present invention, an apparatus is provided for producing one or more composite strands. The apparatus comprises a heated bushing for supplying streams of molten glass to be drawn into continuous first fibers; a drawing device adapted to draw the streams into the first fibers; supply equipment for supplying one or more second fibers of a second material; one or more applicators for applying a size to the first and second fibers; and a device for gathering the first and second fibers into one or more composite strands.

The apparatus may further comprise a drying device for contacting and transferring energy in the form of heat to the first and second sized fibers to dry the size on the first and second fibers before they are gathered into one or more strands. The drying device preferably comprises a heated contact plate.

Also, the gathering device of the apparatus preferably comprises a gathering shoe located between the drying device and the drawing device for gathering the first and second fibers into one or more composite strands. The drawing device may comprise a winding device. Alternatively, the drawing device may comprise an in-line chopping unit.

A single applicator can be used for applying size to both the first and second fibers. Alternatively, a first applicator can be used for applying size to the first fibers and a second applicator can be used for applying size to the second fibers. It is also contemplated that size may be applied to only one of the first and second fibers by a single applicator.

In accordance with a second aspect of the present invention, a method is provided for forming one or more composite strands. The method comprises the steps of drawing a plurality of glass first fibers from a source of molten glass; providing a supply of one or more second fibers of a second material; applying a size to the first and second fibers; and gathering the first and second fibers into one or more composite strands. The second fibers are preferably selected from the group consisting of S-glass fibers, graphite fibers, and polymer fibers. Most preferably, the second fibers are selected from the group consisting of polyamide fibers, polypropylene fibers and polyphenylene sulfide fibers.

The method may also comprise the step of contacting the sized first and second fibers with a heated member to effect drying of the size on the first and second fibers. Furthermore, an aqueous based size can be applied to the first and second fibers. In such a case, the heated member causes at least a portion of the water in the aqueous based size to evaporate. In addition, the size may comprise a film former consisting of an acrylic polymer emulsion or a urethane.

In accordance with a third aspect of the present invention, a composite strand product is provided. The composite strand product is produced by the steps of drawing a plurality of glass fibers from a source of molten glass; providing a supply of one or more second fibers of a second material; applying an aqueous based size to the first and second fibers; contacting the sized first and second fibers with a heated member to effect the drying of the size on the first and second fibers; and gathering the first and second fibers into a composite strand.

In accordance with a fourth aspect of the present invention, an apparatus is provided for producing a plurality of sized first and second fibers. The apparatus comprises a heated bushing for supplying streams of molten glass to be drawn into continuous first fibers; a drawing device adapted to draw the streams into the first fibers; supply equipment for supplying one or more second fibers of a second material; and one or more applicators for applying a size to the first and second fibers.

The apparatus may further comprise a drying device for contacting and transferring energy in the form of heat to the first and second sized fibers to dry the size on the first and second fibers. The drying device preferably comprises a heated contact plate. Also, the drawing device may comprise a winding device or an in-line chopping unit.

In accordance with a fifth aspect of the present invention, a method is provided for forming a plurality of sized first and second fibers. The method comprises the steps of drawing a plurality of first fibers from a source of molten glass; providing a supply of one or more second fibers of a second material; applying a size to the first and second fibers; and commingling the one or more second fibers with the first fibers.

The second fibers are preferably selected from the group consisting of S-glass fibers, graphite fibers, and polymer fibers. Most preferably, the second fibers are selected from the group consisting of polyamide fibers, polypropylene fibers and polyphenylene sulfide fibers.

In a preferred embodiment, the method further comprises the step of contacting the sized first and second fibers with a heated member to effect drying of the size on the first and second fibers. An aqueous based size may be applied to the first and second fibers. In such a case, the heated member may cause at least a portion of the water in the aqueous based size to evaporate.

In accordance with a sixth aspect of the present invention, an apparatus is provided for producing one or more composite strands. The apparatus comprises a heated bushing for supplying streams of molten glass to be drawn into continuous first fibers; a drawing device adapted to draw the streams into the first fibers; supply equipment for supplying one or more second fibers of a second material; an applicator for applying a size to one of the first and second fibers; a drying device for contacting and transferring energy in the form of heat to the sized fibers to dry the size thereon; and a device for gathering the first and second fibers into one or more composite strands.

It is an object of the present invention to provide an improved in-line process for forming a consistent composite strand product. It is another object of the present invention to provide an improved apparatus for producing a composite strand product. It is a further object of the present invention to provide an improved composite strand product. It is another object of the present invention to provide an improved apparatus for producing a plurality of sized first and second fibers. It is yet another object of the present invention to provide an improved method for forming a plurality of sized first and second fibers. These and other objects and advantages of the present invention will be apparent from the following description, the accompanying drawings, and the appended claims.

BRIEF DESCRIPTION OF THE DRAWINGS

FIG. 1 is a perspective view of a composite strand forming apparatus constructed in accordance with a first embodiment of the present invention;

FIG. 1a is a side view of an in-line chopper;

DETAILED DESCRIPTION OF THE INVENTION

Figure 2:
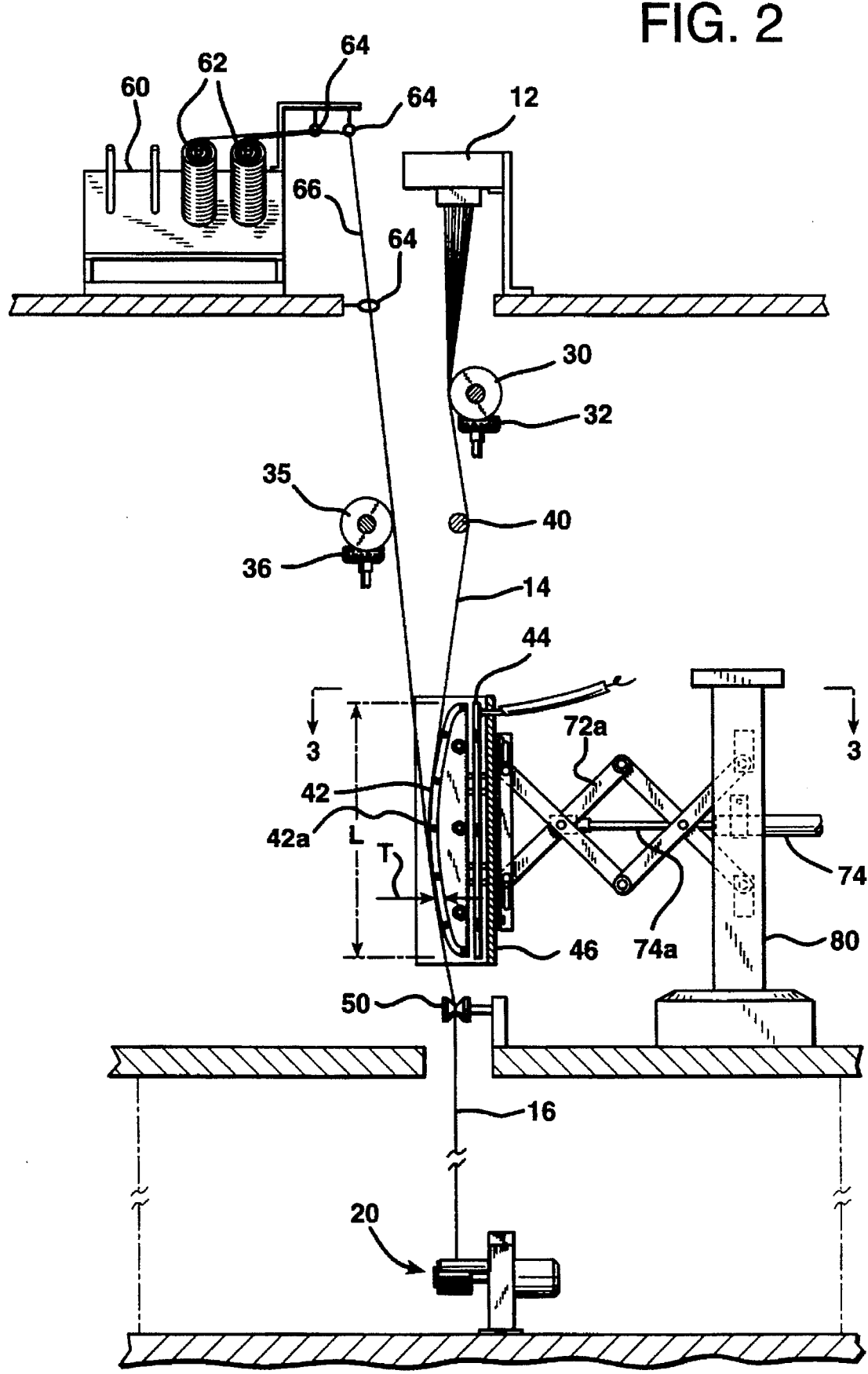
FIG. 2 is a side view of the apparatus illustrated in FIG. 1.

An apparatus for producing a composite strand product in accordance with the present invention is shown in FIG. 1, and is generally designated by the reference numeral 10. The apparatus 10 comprises a bushing 12 having a number of orifices (not shown) through which a plurality of streams of molten glass are discharged. The orifices may be extended by hollow studs or tips (not shown). In the embodiment illustrated in FIG. 1, the streams of glass are mechanically drawn to form first continuous fibers 14 via a winder device 20. The glass fibers may be misted with water using a prepared spray (not shown) located between the bushing 12 and the first applicator roller 30.

The first fibers 14 pass over a forward-facing, first applicator roller 30 which applies a first liquid coating of sizing composition (also referred to herein as size/binder) to the fibers 14. The sizing composition is typically aqueous based, but may be of any other suitable type. A trough 32 containing the sizing composition is positioned below the roller 30. The roller 30 extends into the trough 32 and, as it is rotated by a conventional drive device 30a, transfers sizing composition from the trough 32 to the fibers 14. Other devices or techniques for applying size to the glass fibers 14 may be used in place of the applicator roller 30.

One or more packages 62, two in the illustrated embodiment, of fibers 66 of a second material are supported on a package supply rack 60. The second fibers 66 are withdrawn from the packages 62 via the winder device 20, extend through an appropriate number of guide eyes 64, four in the illustrated embodiment, and pass over a rear-facing, second applicator roller 35. The guide eyes 64 serve to position the second material fibers 66 so that they make good contact with the applicator roller 35 and control the point at which the fibers 66 engage a heated device 41, which will be discussed more explicitly below.

The second material fibers 66 can be chosen from a wide variety of compositions. Preferably, the second material fibers 66 are chosen from the group consisting of S-glass fibers, graphite fibers, and polymer fibers. Most preferably, the second material fibers 66 are selected from the group consisting of polyamide fibers, polypropylene fibers and polyphenylene sulfide fibers. It is also contemplated that any other inorganic or organic fiber not specifically set out herein may also be employed.

The rear-facing, second applicator roller 35 applies a second liquid coating of sizing composition to the second material fibers 66. The second sizing composition may be the same or a different composition as the first sizing composition. A trough 36 containing the sizing composition is positioned below the roller 35. The roller 35 extends into the trough 36 and, as it is rotated by a conventional drive device 35a, transfers sizing composition from the trough 36 to the second material fibers 66. Other devices or techniques for applying size to the second material fibers 66 may be used in place of the applicator roller 35.

After passing over the first applicator roller 30, the first fibers 14 pass over and contact a heating device 41 which is substantially similar to the heating device set out in commonly assigned, copending U.S. patent application Ser. No. 08/291,801, filed Aug. 17, 1994, and entitled "Method and Apparatus for Forming Continuous Glass Fibers," the disclosure of which is hereby incorporated by reference. An engagement roller or bar 40, formed from a ceramic material, is provided between the first applicator roller 30 and the heating device 41 to ensure that the first fibers 14 make good contact with both the first applicator roller 30 and the heated device 41, see FIGS. 1 and 2.

The heating device 41 comprises a first plate 42 having a curved outer surface 42a which is directly contacted by the fibers 14, preferably along its entire extent. A resistance-heated second plate 44, which is connected to a power supply 44a, is spaced a small distance from the first plate 42 and serves to radiantly heat the first plate 42. As the fibers 14 pass over the first plate 42, energy in the form of heat is transferred from the first plate 42 to the sized fibers 14. When an aqueous based size is employed, the heat transferred from the first plate 42 to the fibers 14 evaporates water from the size.

Preferably, the second material fibers 66 contact the first plate 42 at a position below the mid-point of the plate 42 such that the fibers 66 engage only about ⅓ of the length of the plate 42. This prevents possible over-heating of the second fibers 66. Obviously, the type of material used for the second material fibers 66 will determine the amount of acceptable heat exposure. In this situation, "acceptable heat exposure" means the amount of heat energy that can be applied to the second material fibers 66 before their physical characteristics are greatly altered. Thus, some fibers 66, such as various non-polymeric fibers, may contact the plate 42 along more than ⅓ of its length.

The first plate 42 may have a length L=40.0 inches, a thickness T=0.375 inch, and a radius of curvature equal to 267 inches, see FIG. 2. The plate 42 is formed from metal, such as stainless steel or copper. Preferably, the plate 42 is maintained at a temperature of between 1000° F. and 1500° F., and most preferably at a temperature of 1200° F.

In accordance with one embodiment of the present invention, the size/binder comprises: water; a film former; one or more coupling agents, such as silane coupling agents which are commercially available from OSI Industries under the product names A1100 and A1120; one or more lubricants such as a fatty acid ester which is commercially available from the Stepan Co. under the product name KESSCO BES, and a mixture of stearic acid and acetic acid which is commercially available from Owens-Corning Fiberglas under the product name K12; and modifiers such as a maleic anhydride modified polypropylene wax which is commercially available from the Chemical Corporation of America under the product name Polyemulsion 43N40, terephthalic acid which is commercially available from the Aldrich Chemical Company, and a partial ammonium salt of butadiene-maleic acid copolymer which is commercially available from Lindau Chemical Inc. under the product name Maldene 286. Preferably, the film former comprises a vinyl acrylic, such as those commercially available from Franklin International under the product names Covinax 201 and Covinax 225, or a urethane such as the one commercially available from Reichold Chemicals Inc. under the product name Synthemul 97903-00. Also, epoxies, polyvinyl acetates, and polyesters can be used as film formers in the present invention.

As the second fibers 66 engage the first plate 42, they become commingled with the first fibers 14. After passing over the first plate 42, the first and second fibers 14 and 66 are gathered together via a gathering shoe 50 to form a single composite strand 16. From the gathering shoe 50, the strand 16 is wound via the winder device 20, a Type-30™ winder device in the illustrated embodiment, onto a sleeve or tube 90, see FIG. 1, to form a composite strand package 92. The winder device 20 comprises a rotatable member or a collet 22, upon which is provided the removable tube 90. The winder device 20 also includes a conventional traversing mechanism 24 to distribute the strand 16 along the length of the tube 90 to form a square-edge package. Also provided is an air supply device 26 which outputs a plurality of streams of air which impinge upon the strand 16 to cool the strand 16 before it is wound.

In an alternative embodiment, the single strand 16 can be drawn within a conventional in-line chopper 55, one of which is commercially available from Neumag U.S.A. Corporation under the product name NMC-1 Cutting Machine, and cut into discrete sections which may be collected in a bin 57, see FIG. 1A. The discrete sections may have a length ranging from about ⅟₁₆ to 2 inches.

The process of the present invention produces a composite strand 16 having a glass (first fiber) percentage of about 30 to 70 weight percent, a second material (second fiber) percentage of about 30 to 70 weight percent, and a binder/size percentage of about 0 to 15 weight percent. However, the process can produce a composite strand having from about 5 to 90 weight percent of second material (second fibers).

Figure 3:
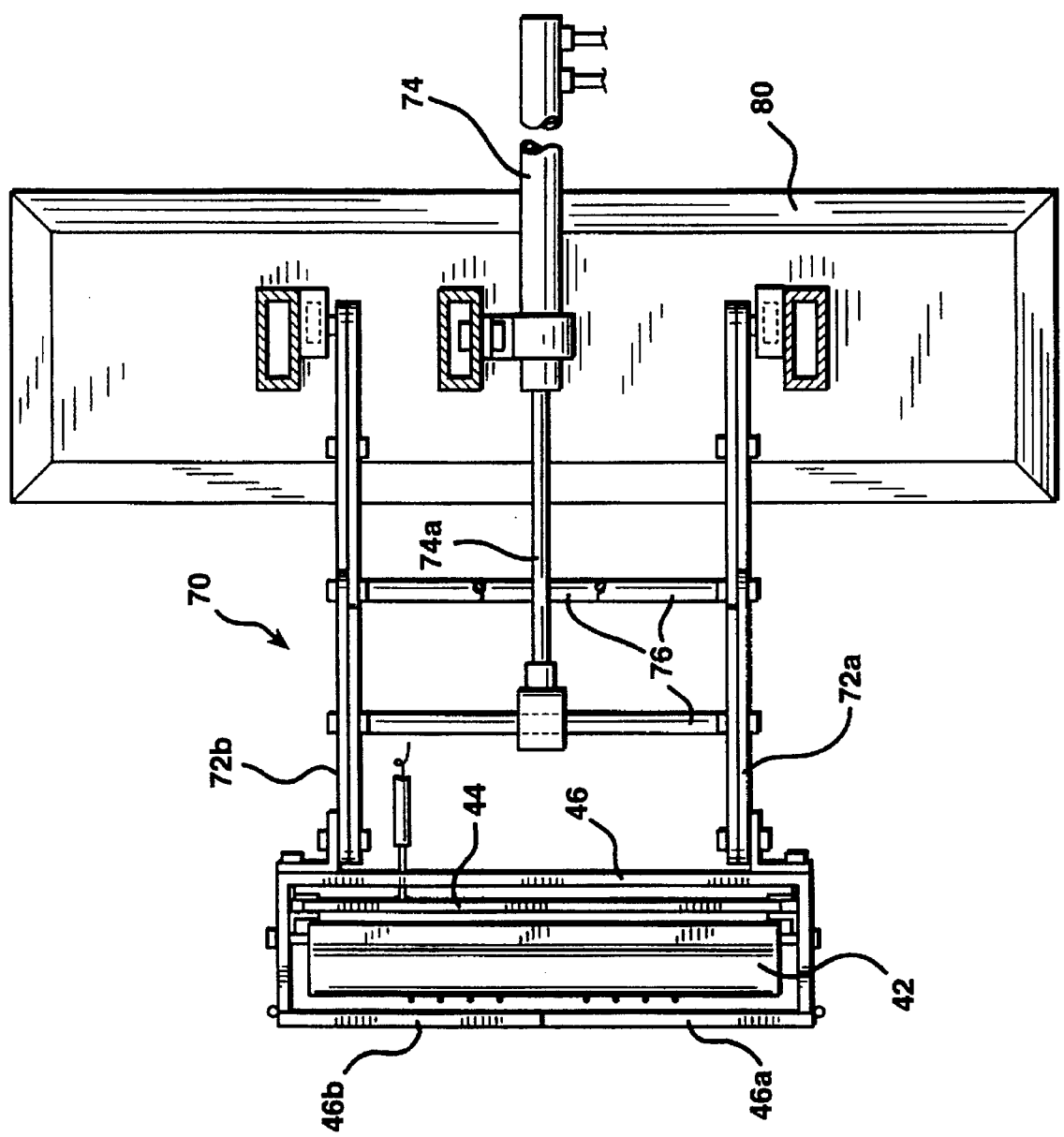
FIG. 3 is a view taken along view line 3—3 in FIG. 2.

Referring to FIGS. 2 and 3, the first and second plates 42 and 44 are housed within a cabinet 46, which is moveable toward and away from the fibers 14. The cabinet 46 includes first and second doors 46a and 46b which, when closed, serve as heat shields. The doors 46a and 46b are preferably formed from insulation board, such as 1 inch thick calcium silicate.

A reciprocating device 70 is provided for moving the cabinet 46 toward and away from the fibers 14. The device 70 comprises first and second linkage mechanisms 72a and 72b and a piston-cylinder drive unit 74. The linkage mechanisms 72a and 72b are connected to the cabinet 46 and to a support 80. The piston-cylinder drive unit 74 extends from the support 80 and is fixedly connected to one of a plurality of support members 76 extending between the first and second linkage mechanisms 72a and 72b, see FIG. 3. Reciprocating movement of the piston 74a of the drive unit 74 effects movement of the cabinet 46 and, hence, the first plate 42.

Figure 4:
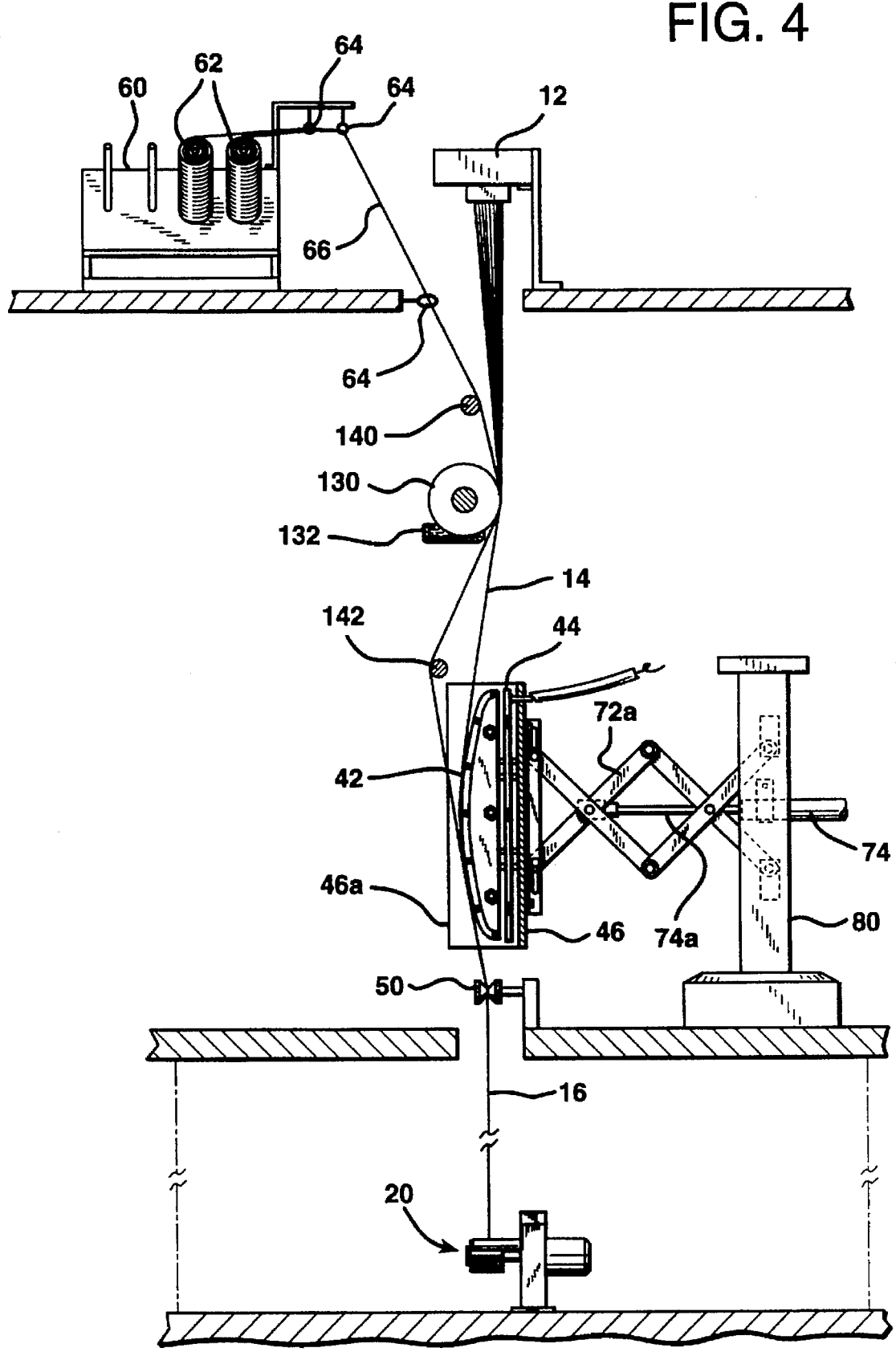
FIG. 4 is a side view of a composite strand forming apparatus constructed in accordance with a second embodiment of the present invention; and, FIG. 5 is a front view of a composite strand forming apparatus constructed in accordance with a third embodiment of the present invention.

In a first alternative embodiment shown in FIG. 4, where like reference numerals indicate like elements, a single applicator roller 130 is used to apply sizing composition to both the first and second fibers 14 and 66. A trough 132 containing the sizing composition is positioned below the roller 130. In this embodiment, the second fibers 66 pass over a first positioning bar or roller 140 prior to making contact with the applicator roller 130 and engage a second positioning bar or roller 142 after contacting the applicator roller 130 but before engaging the plate 42.

Figure 5:
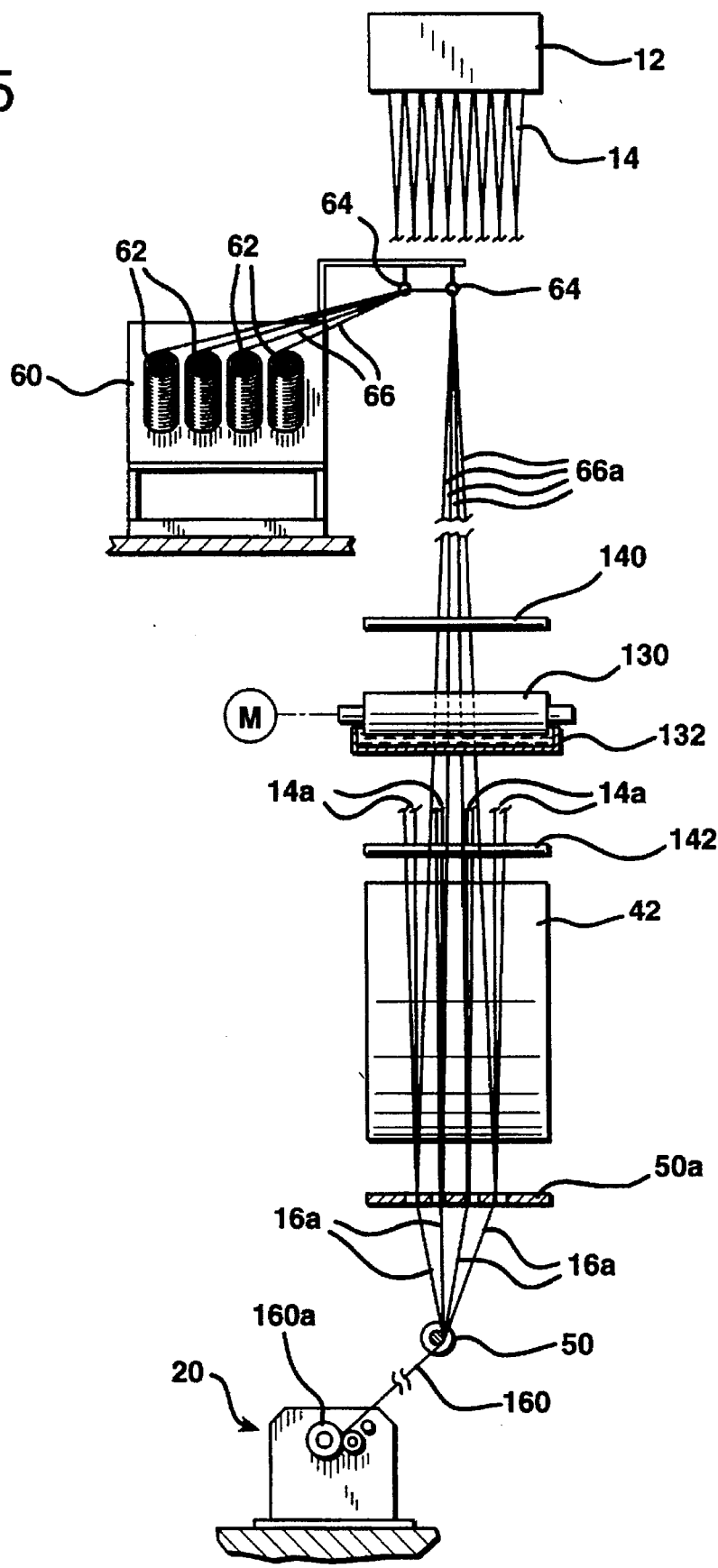

In a second alternative embodiment shown in FIG. 5, the applicator roller 130 and the positioning bars 140 and 142 are positioned as shown in FIG. 4 such that only the second fibers 66 engage the first and second positioning bars 140 and 142 and both the first and second fibers 14 and 66 pass over the applicator roller 130. A separating shoe 50a is used to separate the second fibers 66 into second fiber groups 66a comprising one or more second fibers 66 and separate the first fibers into a like number of first fiber groups 14a having one or more first fibers 14. Each first fiber group 14a becomes commingled with a second fiber group 66a such that a plurality of discrete composite strands 16a are formed.

The discrete strands 16a may be gathered by a gathering shoe 50 into a combined single strand 160 and wound via winder device 20 to form a package 160a. Alternatively, one or more of the discrete strands 16a may be wound into two or more separate packages via two or more winding devices (not shown).

The composite strands formed in accordance with the present invention may be cut into discrete sections and employed in an injection molding process. They may also be used as continuous composite strands in methods such as glass mat thermoplastic (GMT), pultrusion, filament winding, knitting, weaving, extrusion coating, needling, texturizing, and forming continuous fiber mats.

The method and apparatus of the present invention produce composite strands having several advantages over the prior art. First, the process is capable of producing ternary, quaternary, or even more complex composite strands. For example, the strands can contain several kinds of glass, such as E glass and S2 glass, and also contain several kinds of diverse organic material, such as polypropylene and polyphenylene sulfide. Secondly, the composite strands of the present invention demonstrate improved dispersion of the fibers in final composite parts. Third, the binder/size of the present invention is believed to enhance the composite part properties such as tensile and impact strength. Also, the relatively high amount of binder in the composite strands results in a composite strand product that maintains its integrity and is easy to handle. Finally, different binders/sizes can be applied to the diverse fibers by way of the separate applicator rollers.

The following examples are given to illustrate certain preferred details of the invention, it being understood that the details of the examples are not to be taken as in any way limiting the invention thereto.

EXAMPLE 1

Glass marbles were melted and drawn through a two thousand hole bushing at the rate of 900 feet per minute (fpm) at a yield of thirty three pounds per hour. The resultant fibers had the "M" (16 micron) filament diameter. The newly formed E-glass fibers were immediately cooled with a prepared spray of water. The fibers were then treated with the size formulation of Example 5 via a forward facing applicator roller. The fibers were held against the applicator surface by a ceramic bar which slightly alters the fiber direction. Polyamide fiber of 1260 denier, commercially available from Dupont Chemical under the product designation "Nylon 66, 1400 decitex/1260 denier, 210 fil, R20 TWT, Type 728" was roved in a separate operation into two 15 pound packages, each of 2520 to 5040 denier. These packages were placed on a package supply rack located at the bushing level of the glass forming operation. The two polymer fiber ends were then pulled through two ceramic guide eyes at the bushing level, through two ceramic guide eyes mounted immediately above a rear-facing second applicator roller, over the rear facing applicator roller which applied the sizing composition of Example 5 to the two polymer fibers, and into the glass stream. The commingled polymer and glass fibers were dried on a forty inch heated plate, which was heated to a temperature of approximately 1200° F., and wound on a rotating collet.

EXAMPLE 2

Polypropylene fibers and glass fibers were commingled in the same manner as described in Example 1 with the exception that the size formulation of Example 7 was used. Polypropylene fiber of 2520 denier, which is commercially available from Amoco/Phillips under the product designation "MARVESS Olefin Filament Yarn and J01 Natural 2520 DEN-210-00," was roved in a separate operation into two 15 pound packages, each of 5040 to 10080 denier. These packages were placed on the package supply rack located at the bushing level and two roved fibers of polypropylene were used to produce polypropylene/glass commingled strand product.

EXAMPLE 3

Polyphenylene sulfide fibers and glass fibers were commingled in the same manner as described in Example 1 with the exception that the size formulation of Example 9 was used. Polyphenylene sulfide fiber of 200 denier, which is commercially available from Amoco/Phillips under the product designations "polyphenylene sulfide-filament" or "staple CP-1-26G" was roved in a separate operation into three 15 lb. packages, each of 1000 denier. These packages were placed on a package supply rack located at the bushing level and three roved fibers of polyphenylene sulfide were used to produce commingled product.

EXAMPLE 4

S2-glass was commingled with E-glass in a manner similar to the way the polymer fibers were commingled with the E-glass fibers in Example 1. In this case, two packages of S2-glass, which is commercially available from Owens Corning Fiberglas under the product designation "Product 449, Yield=750," placed on the package supply rack located at the bushing level. Two ends of S2-glass were pulled into the E-glass stream in exactly the same way that the ends of polyamide fibers were pulled into the E-glass stream in Example 1. The sizing composition set out in Example 9 below was applied to both the S2-glass and E-glass. The loading of S2-glass incorporated into the final product using this method ranged from 20% to 40%.

EXAMPLE 5

Six thousand grams (g) of binder were formed by the following procedure: 15 g (0.25% weight percentage as received) of A-1100 silane were added to 2345 g of deionized water. This was stirred for several minutes.

One thousand eight hundred seventy-five g (31.25%) of the film former Covinax 201 and 1500 g (25.0%) of the film former Covinax 225 were combined in a two gallon pail. The silane solution was then mixed with the mixture of film formers using moderate agitation. Four hundred eighty g (8.0%) of Maldene 286 were added to the mixture of silane and film formers. Finally, 200 g (3.3%) of BES homogenate were added under continual stirring. The solids concentration of the resulting binder polymer solution was 30%. This binder polymer solution is useful where polyamide is commingled with glass, see Example 1 above.

EXAMPLE 6

Six thousand grams (g) of binder were formed by the following procedure: 15 g (0.25%) of A-1100 silane were added to 1870 g of deionized water. This was allowed to stir for several minutes. Three thousand four hundred fifty g (57.5%) of the film former Synthemul 97903-00 were poured into a two gallon pail. The silane solution was then mixed with the film former using moderate agitation. Four hundred eighty g (8.0%) of Maldene 286 were added to the mixture of silane and film former. Finally, 200 g (3.3%) of BES homogenate were added under continual stirring. The solids concentration of the resulting binder polymer solution was 30%. This binder polymer solution is useful where polyamide is commingled with glass.

EXAMPLE 7

Six thousand g of binder were formed by the following procedure: 15 g (0.25%) of A-1100 silane were added to 2325 g of deionized water. This was allowed to stir for several minutes. One thousand eight hundred seventy five g (31.25%) of the film former Covinax 201 and 1500 g (25.0%) of the film former Covinax 225 were combined in a two gallon pail. The silane solution was then mixed with the mixture of film formers using moderate agitation. A terephthalic acid solution was prepared by dissolving 30 g (0.5%) of terephthalic acid in 30 ml of concentrated ammonium hydroxide. The terephthatic acid solution was added to the mixture of silane and film formers. Then, 300 g (5.0%) of Polyemulsion 43N40 were added to the mixture. Finally, 200 g (3.3%) of BES homogenate were added under continual stirring. The solids concentration of the resulting binder polymer solution was 30%. This binder polymer solution is useful where polypropylene is commingled with glass.

EXAMPLE 8

Six thousand g of binder were formed by the following procedure: 15 g (0.25%) of A-1100 silane were added to 2020 g of deionized water. This was allowed to stir for several minutes. Three thousand four hundred fifty g (57.5%) of the film former Synthemul 97903-00 were poured into a two gallon pail. The silane solution was then mixed with the film former using moderate agitation. A terephthalic acid solution was prepared by dissolving 30 g (0.5%) of terephthalic acid in 30 ml of concentrated ammonium hydroxide. The terephthalic acid solution was added to the mixture of silane and film former. Then, 300 g (5.0%) of Polyemulsion 43N40 were added to the mixture. Finally, 200 g (3.3%) of BES homogenate were added under continual stirring. The solids concentration of the resulting binder polymer solution was 30%. This binder polymer solution is useful where polypropylene is commingled with glass.

EXAMPLE 9

Six Thousand g of binder were formed by the following procedure: 15 g (0.25%) of A-1100 silane were added to 1870 g of deionized water. This were allowed to stir for several minutes. Three thousand four hundred fifty g (57.5%) of the film former Synthemul 97903-00 were poured into a two gallon pail. The silane solution was then mixed with the film former using moderate agitation. Finally, 200 g (3.3%) of BES homogenate were added under continual stirring. The solids concentration of the resulting binder polymer solution was 30%. The binder polymer solution is useful with a wide variety of materials including polyphenylene sulfide and inorganic fibers.

EXAMPLE 10

Six thousand g of binder were formed by the following procedure: 15 g (0.25%) of A-1100 silane were added to 2345 g of deionized water. This was allowed to stir for several minutes. One thousand eight hundred seventy-five g (31.25%) of the film former Covinax 201 and 1500 g (25.0%) of the film former Covinax 225 were combined in a two gallon pail. The silane solution was then mixed with the mixture of film formers using moderate agitation. Finally, 200 g (3.3%) of BES homogenate were added under continual stirring. The solids concentration of the resulting binder polymer solution was 30%. The binder polymer solution is useful with a wide variety of materials including polyphenylene sulfide and inorganic fibers.

Having described the invention in detail and by reference to preferred embodiments thereof, it will be apparent that modifications and variations are possible without departing from the scope of the invention defined in the appended claims.

What is claimed is:

1. A method for forming one or more composite strands comprising the steps of:

drawing a plurality of glass first fibers from a source of molten glass;

providing a supply of one or more second fibers of a second material;

applying a size to said first and second fibers;

contacting said sized first and second fibers with a heated member to effect drying of said size on said first and second fibers, said contacting of said sized first and second fibers with said heated member occurring in-line with said drawing of said first fibers; and gathering said first and second fibers into one or more composite strands.

2. A method for forming one or more composite strands as set forth in claim 1, wherein said second fibers are selected from the group consisting of S-glass fibers, graphite fibers, and polymer fibers.

3. A method for forming one or more composite strands as set forth in claim 1, wherein said second fibers are selected from the group consisting of polyamide fibers and polypropylene fibers.

4. A method for forming one or more composite strands as set forth in claim 1, wherein said size comprises an aqueous based size, said heated member causes at least a portion of the water in the aqueous based size to evaporate.

5. A method for forming one or more composite strands as set forth in claim 4, wherein said aqueous based size comprises a film former consisting of an acrylic polymer emulsion.

6. A method for forming one or more composite strands as set forth in claim 1, wherein said heated member is stationary while contacting said sized fibers.

7. A method for forming one or more composite strands as set forth in claim 1, wherein each of said one or more composite strands has said second fibers interspersed with said first fibers generally throughout the strand cross section.

8. A method for forming one or more composite strands as set forth in claim 1, wherein said heated member is maintained at a temperature of between about 1000° and 1500° F. to effect drying of said size on said fibers.

9. A method for forming a plurality of sized first and second fibers comprising the steps of:

drawing a plurality of first fibers from a source of molten glass;

providing a supply of one or more second fibers of a second material;

applying a size to said first and second fibers;

contacting said sized first and second fibers with a heated member to effect drying of said size on said first and second fibers, said contacting of said sized first and second fibers with said heated member occurring in-line with said drawing of said first fibers;

commingling said one or more second fibers with said first fibers.

10. A method for forming a composite strand as set forth in claim 9, wherein said one or more second fibers are selected from the group consisting of S-glass fibers, graphite fibers, and polymer fibers.

11. A method for forming a composite strand as set forth in claim 9, wherein said second fibers are selected from the group consisting of polyamide fibers and polypropylene fibers.

12. A method for forming a composite strand as set forth in claim 9, wherein said size comprises an aqueous based size, said heated member causes at least a portion of the water in the aqueous based size to evaporate.

13. A method for forming a plurality of sized first and second fibers as set forth in claim 9, wherein said heated member is stationary while contacting said sized fibers.

14. A method for forming a plurality of sized first and second fibers as set forth in claim 9, wherein each of said one or more composite strands has said second fibers interspersed with said first fibers generally throughout the strand cross section.

15. A method for forming a plurality of sized first and second fibers as set forth in claim 9, wherein said heated member is maintained at a temperature of between about 1000° and 1500° F. to effect drying of said size on said fibers.

16. A method for forming a plurality of sized first and second fibers comprising the steps of:

drawing a plurality of first fibers from a source of molten glass;

providing a supply of one or more second fibers of a second material;

applying a size to said first and second fibers;

contacting said sized first and second fibers with a heated member to heat said size on said first and second fibers, said contacting of said sized first and second fibers with said heated member occurring in-line with said drawing of said first fibers;

commingling said one or more second fibers with said first fibers.

17. A method for forming a composite strand as set forth in claim 16, wherein said size comprises an aqueous based size, and said heated member causing at least a portion of the water in the aqueous based size to evaporate.

* * * * *